(12) United States Patent
Suzuki et al.

(10) Patent No.: US 12,715,373 B2
(45) Date of Patent: Aug. 25, 2026

(54) RESIN-MOLDED ARTICLE

(71) Applicant: MORIROKU TECHNOLOGY COMPANY, LTD., Tokyo (JP)

(72) Inventors: Mitsuru Suzuki, Tokyo (JP); Takashi Tanaka, Tokyo (JP)

(73) Assignee: MORIROKU CO., LTD., Tokyo (JP)

( * ) Notice: Subject to any disclaimer, the term of this patent is extended or adjusted under 35 U.S.C. 154(b) by 329 days.

(21) Appl. No.: 18/457,565

(22) Filed: Aug. 29, 2023

(65) Prior Publication Data

US 2024/0075887 A1 Mar. 7, 2024

(30) Foreign Application Priority Data

Sep. 1, 2022 (JP) ................................ 2022-138958

(51) Int. Cl.
*B60R 13/00* (2006.01)

(52) U.S. Cl.
CPC ................................. *B60R 13/005* (2013.01)

(58) Field of Classification Search
CPC ... B60R 13/04; B60R 13/0206; B60R 13/005; B62D 25/12; Y10T 24/30; F16B 2/22; F16B 5/065
See application file for complete search history.

(56) References Cited

U.S. PATENT DOCUMENTS

| | | | | |
|---|---|---|---|---|
| 8,518,519 | B2 * | 8/2013 | Kubo | B32B 3/04 428/121 |
| 10,081,394 | B2 * | 9/2018 | Ikeno | B62D 25/163 |
| 2002/0139081 | A1 * | 10/2002 | Nada | B60R 13/04 52/716.5 |
| 2004/0135383 | A1 * | 7/2004 | Ariga | B60R 19/48 293/117 |
| 2004/0262932 | A1 * | 12/2004 | Abe | B60R 13/00 296/1.08 |
| 2019/0366946 | A1 * | 12/2019 | Shinohara | F16B 21/086 |

FOREIGN PATENT DOCUMENTS

| | | | | | |
|---|---|---|---|---|---|
| JP | 2000346018 | A | * | 12/2000 | B62D 25/18 |
| JP | 2008143366 | A | * | 6/2008 | B60R 19/24 |
| JP | 2010241306 | A | * | 10/2010 | B60R 13/02 |
| JP | 2017-067115 | A | | 4/2017 | |
| WO | WO-2017154177 | A1 | * | 9/2017 | B60R 13/04 |

* cited by examiner

*Primary Examiner* — Carly W. Lynch
(74) *Attorney, Agent, or Firm* — Rankin, Hill & Clark LLP

(57) ABSTRACT

A resin-molded article is configured so that a body having a design surface and a clip attachment member which is formed on a back surface of the design surface of the body and to which a clip is attachable, the body and the clip attachment member being integrally formed. The clip attachment member includes an attachment wall raised from the back surface, and a rib extending from the attachment wall to the back surface and reinforcing the attachment wall. A through-hole penetrating through the attachment wall is formed at a position adjacent to the rib of the attachment wall.

3 Claims, 7 Drawing Sheets

30
20
BS
41b2,41b
43
41c
44
41b1,41b
EL
41c
43
44
EL
41b
51
31a
Le
Rr
Fr
Ri

Rr
Up
Dn
Fr
31
41b1,41b
41a
42
43
51
31a

EMBODIMENT

COMPARATIVE EXAMPLE

Le
Rr
Fr
Ri
30
BS
31a
41b2,41b
41c
43
41b1,41b
41c
43
51
41b
20

RESIN-MOLDED ARTICLE

FIELD OF THE INVENTION

The present invention relates to a resin-molded article that is attached to an attached member via a clip.

BACKGROUND

A resin-molded article is sometimes attached to a vehicle body for the purpose of decorating a vehicle. The resin-molded article is attached, for example, by attaching a clip to the resin-molded article and by pushing the clip into a hole opened in a vehicle body. As a technique of the related art regarding such a resin-molded article, there is a technique disclosed in Japanese Application No. 2017-67115.

A resin-molded article described in Japanese Application No. 2017-67115 is configured so that a body having a design surface and a clip attachment member which is formed on a back surface of the design surface of the body and to which a clip is attachable are integrally formed. In addition, the clip attachment member includes an attachment wall raised from the back surface, and ribs extending from the attachment wall along the back surface and reinforcing the attachment wall.

SUMMARY

According to research of the inventors, it has been found that defects having a recessed shape and called sink marks occur on the design surface of the resin-molded article in which the clip attachment member and the ribs are formed on the back surface. It has also been found that such defects are likely to appear on a design surface side of portions corresponding to boundary portions between the clip attachment member and the ribs. In order to prevent such defects, it can be considered that the ribs are not formed; however, in this case, sufficient strength cannot be ensured for the clip attachment member.

An object of the present disclosure is to provide a resin-molded article capable of ensuring the strength of a clip attachment member while preventing the occurrence of defects.

According to the present disclosure, there is provided a resin-molded article including a body having a design surface, and a clip attachment member which is formed on a back surface of the design surface of the body and to which a clip is attachable, the body and the clip attachment member being integrally formed. The clip attachment member includes an attachment wall raised from the back surface, and a rib extending from the attachment wall to the back surface and reinforcing the attachment wall. A through-hole penetrating through the attachment wall is formed at a position adjacent to the rib of the attachment wall.

According to the invention, it is possible to provide the resin-molded article capable of ensuring the strength of the clip attachment member while preventing the occurrence of defects.

DETAILED DESCRIPTION

Figure 1B:
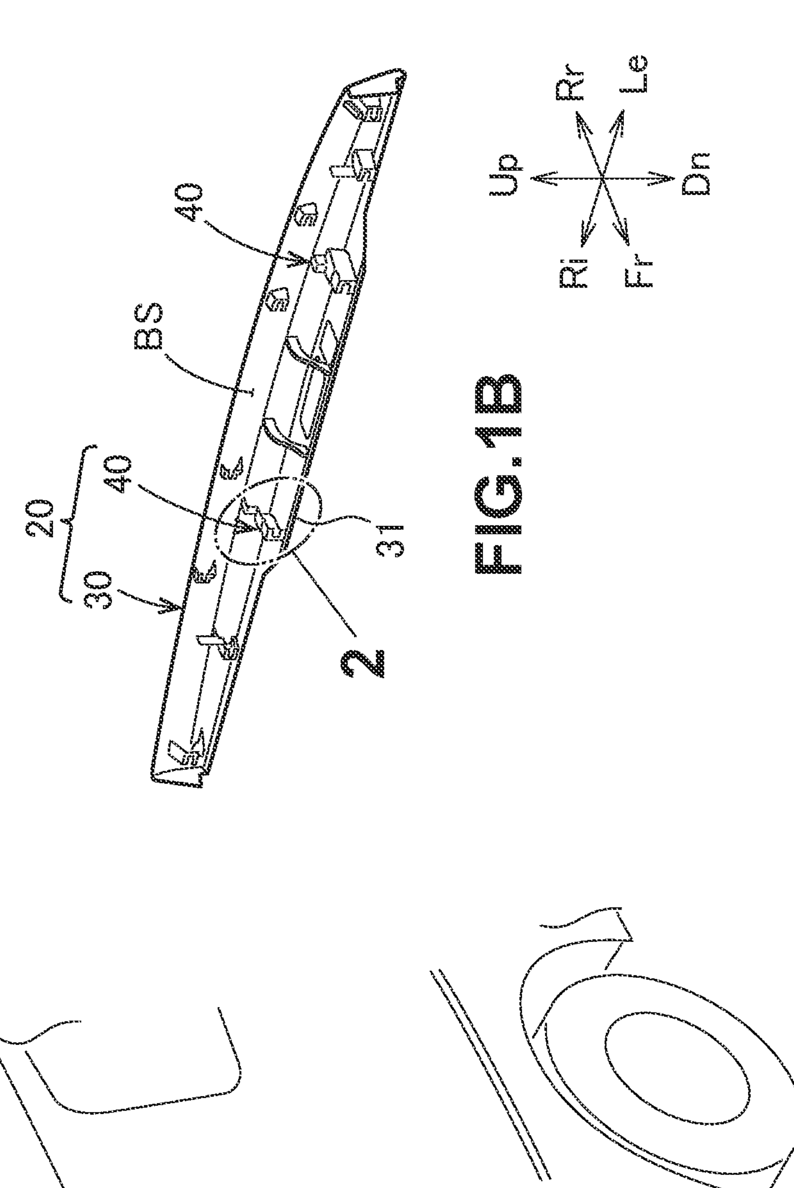
FIG. 1B is a perspective view of the resin-molded article illustrated in FIG. 1A when viewed from a back surface side.

An embodiment of the invention will be described below with respect to the accompanying drawings. Incidentally, in the description, left-right refers to left-right with respect to an occupant of a vehicle to which a resin-molded article is attached, and front-rear refers to front-rear with respect to a traveling direction of the vehicle. In addition, in the drawings, Fr represents the front, Rr represents the rear, Le represents the left when viewed from the occupant, Ri represents the right when viewed from the occupant, Up represents the top or up, and Dn represents the bottom or down.

Embodiment

An embodiment will be described with reference to the drawings.

Figure 1A:
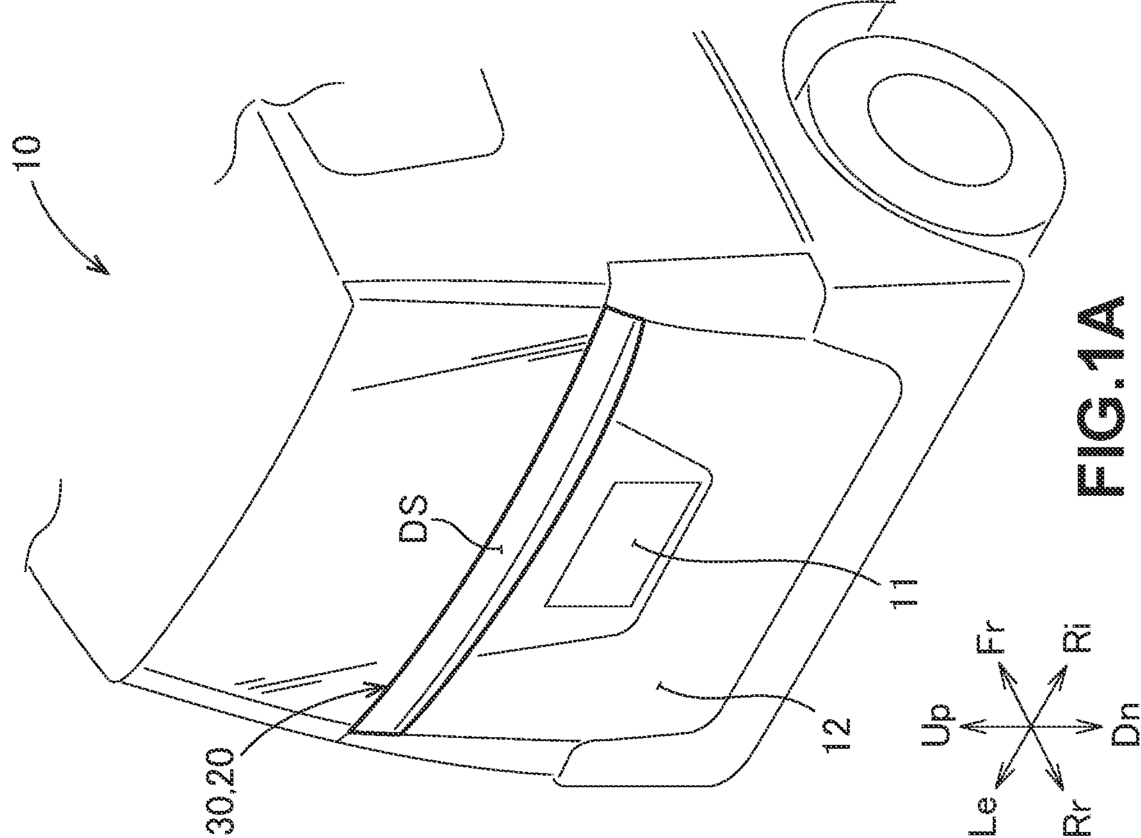
FIG. 1A is a perspective view of a vehicle to which a resin-molded article according to an embodiment is attached.

Referring to FIG. 1A, FIG. 1A illustrates a perspective view of a vehicle 10 when viewed from the rear. A resin-molded article 20 is, for example, attached to the vehicle 10 as an attached member via a clip. The resin-molded article 20 is, for example, a decorative component attached to a vehicle body 12 above a license plate 11.

Referring also to FIG. 1B, FIG. 1B illustrates the resin-molded article 20 when viewed from the front. The resin-molded article 20 is, for example, a resin component formed by resin molding such as injection molding. The resin-molded article 20 is configured so that a body 30 having a design surface DS which is a rear surface and a clip attachment member 40 which is formed on a back surface BS of the design surface DS of the body 30 and to which a clip is attachable are integrally formed. A plurality of the clip attachment member 40 may be formed on the back surface BS.

Incidentally, any resin can be used as the material of the resin-molded article 20.

Figure 2:
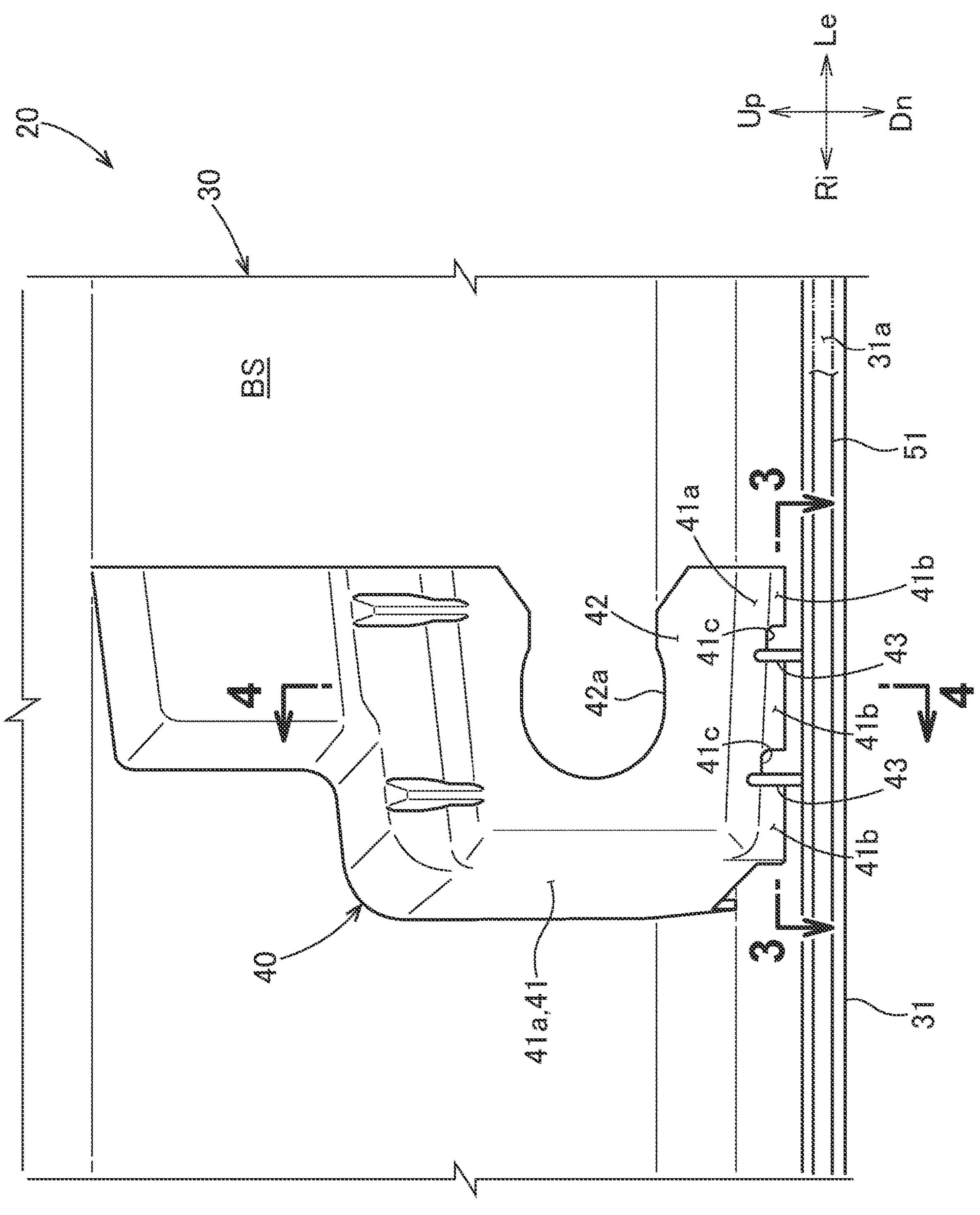
FIG. 2 is an enlarged view of a portion 2 of FIG. 1B.
Figure 3:
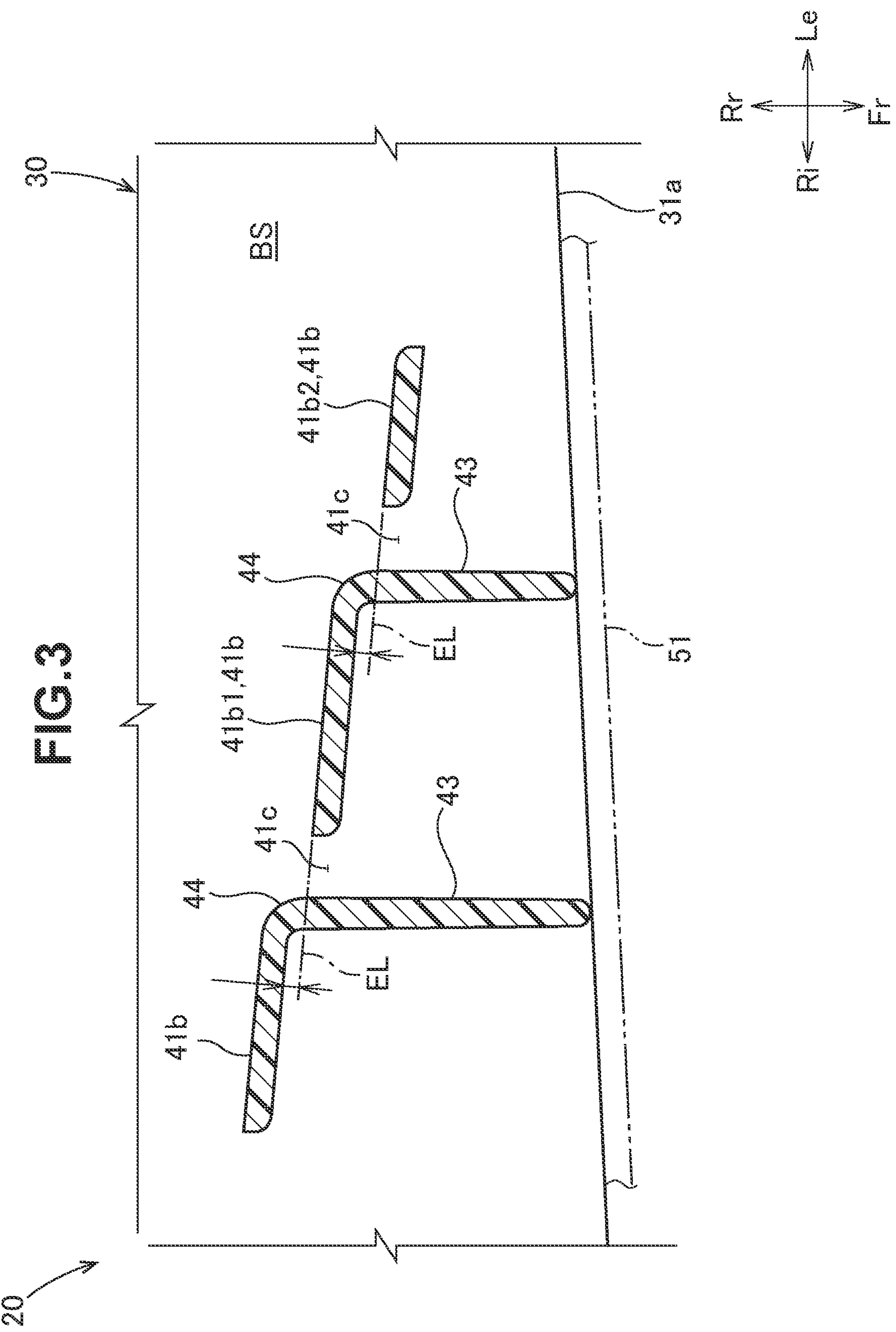
FIG. 3 is a cross-sectional view taken along line 3-3 of FIG. 2.
Figure 4:
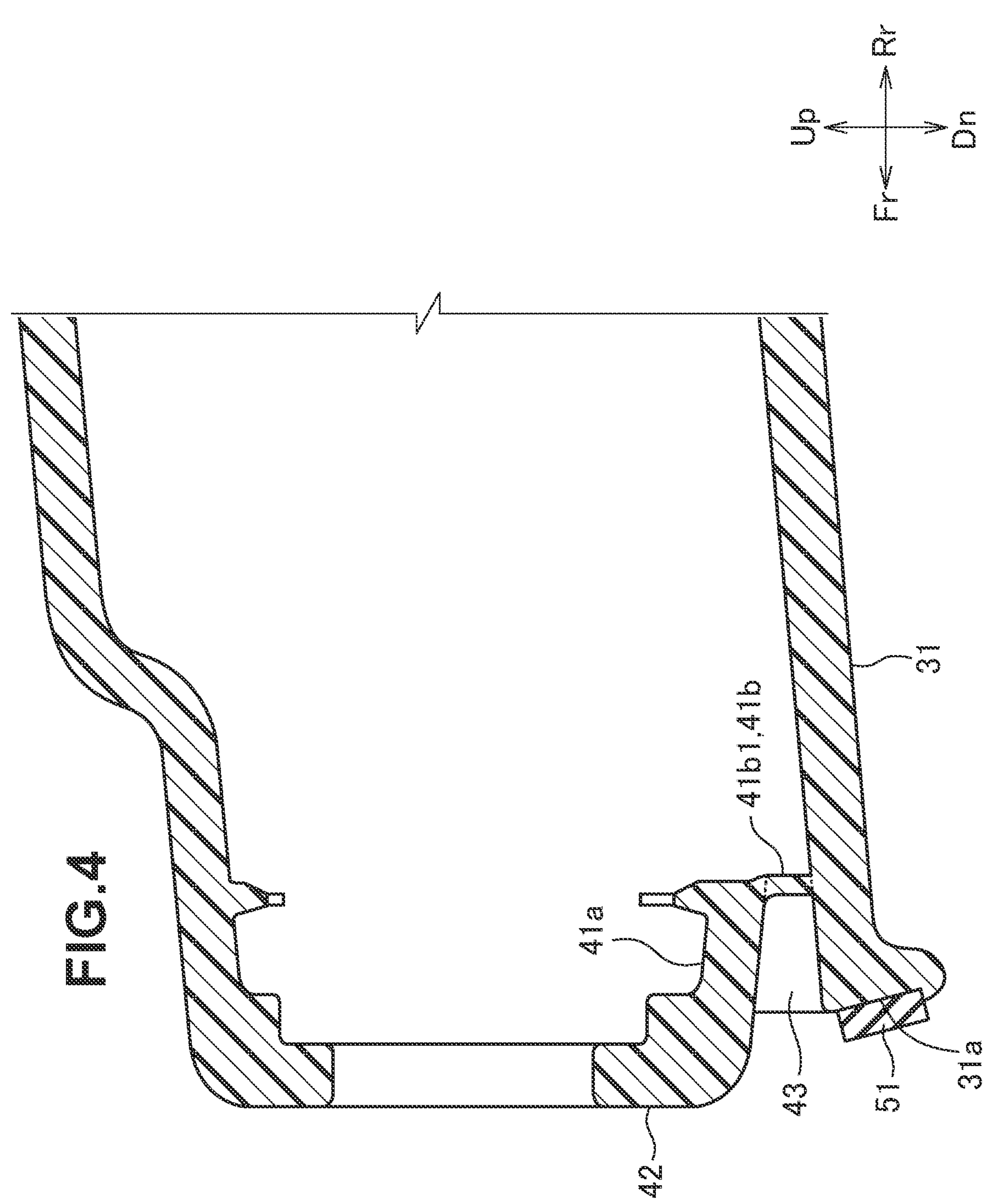
FIG. 4 is a cross-sectional view taken along line 4-4 of FIG. 2.

Referring to FIG. 2 to FIG. 4, an edge of the body 30 serves as a bent portion 31 bent to the front. Namely, the body 30 includes the bent portion 31. In addition, a tip of the bent portion 31 serves as a seal attachment portion 31*a* to which a seal 51 is attachable. A primer for improving the adhesion of the seal 51 is applied to the seal attachment portion 31*a*.

For example, after the resin-molded article 20 is manufactured, it is checked visually or by a camera whether or not a recess called a sink mark has occurred on the design surface DS (refer to FIG. 1A). At this time, the primer is applied and the seal is attached to the seal attachment portion 31*a* of the resin-molded article 20 including the bent portion 31 and having no defects on the design surface DS.

The clip attachment member 40 includes an attachment wall 41 raised from the back surface BS; a clip support portion 42 covering a tip of the attachment wall 41 and supporting the attached clip; and a plurality of ribs 43 extending from the attachment wall 41 to the back surface BS and reinforcing the attachment wall 41.

The attachment wall 41 includes a wall body 41*a* raised from the back surface BS, and protruding portions 41*b* protruding the wall body 41*a* toward the bent portion 31. Through-hole 41*c* penetrating through the attachment wall 41 are opened in the attachment wall 41. The through-hole 41*c* is formed to correspond to each of the ribs 43. Tips of the protruding portions 41*b* may extend to the bent portion 31.

The protruding portions 41*b* are inclined diagonally with respect to the bent portion 31, and are formed in a stepped shape with the through-hole 41*c* interposed therebetween. It can also be said that a portion 41*b*2 on the other side is offset with respect to an extension line EL of a portion 41*b*1 on one side with the through-hole 41*c* interposed therebetween. In addition, boundary portions 44 between the protruding portions 41*b* (attachment wall 41) and the ribs 43 are formed in a curved shape.

The clip support member 42 includes an opening portion 42*a* which has a substantially C shape and which is open in one direction such that the clip is slidable and attachable. A portion of the attachment wall 41 corresponding to the opening portion 42*a* for a clip is also open.

A semi-enclosed space which is surrounded by the attachment wall 41 and the clip support member 42 and of which only one surface is open can be formed by providing a slide block corresponding to the shape of the semi-enclosed space when the clip attachment member 40 is molded, and by moving and removing the slide block in a direction in which the attachment wall 41 is open, after molding.

Figure 6:
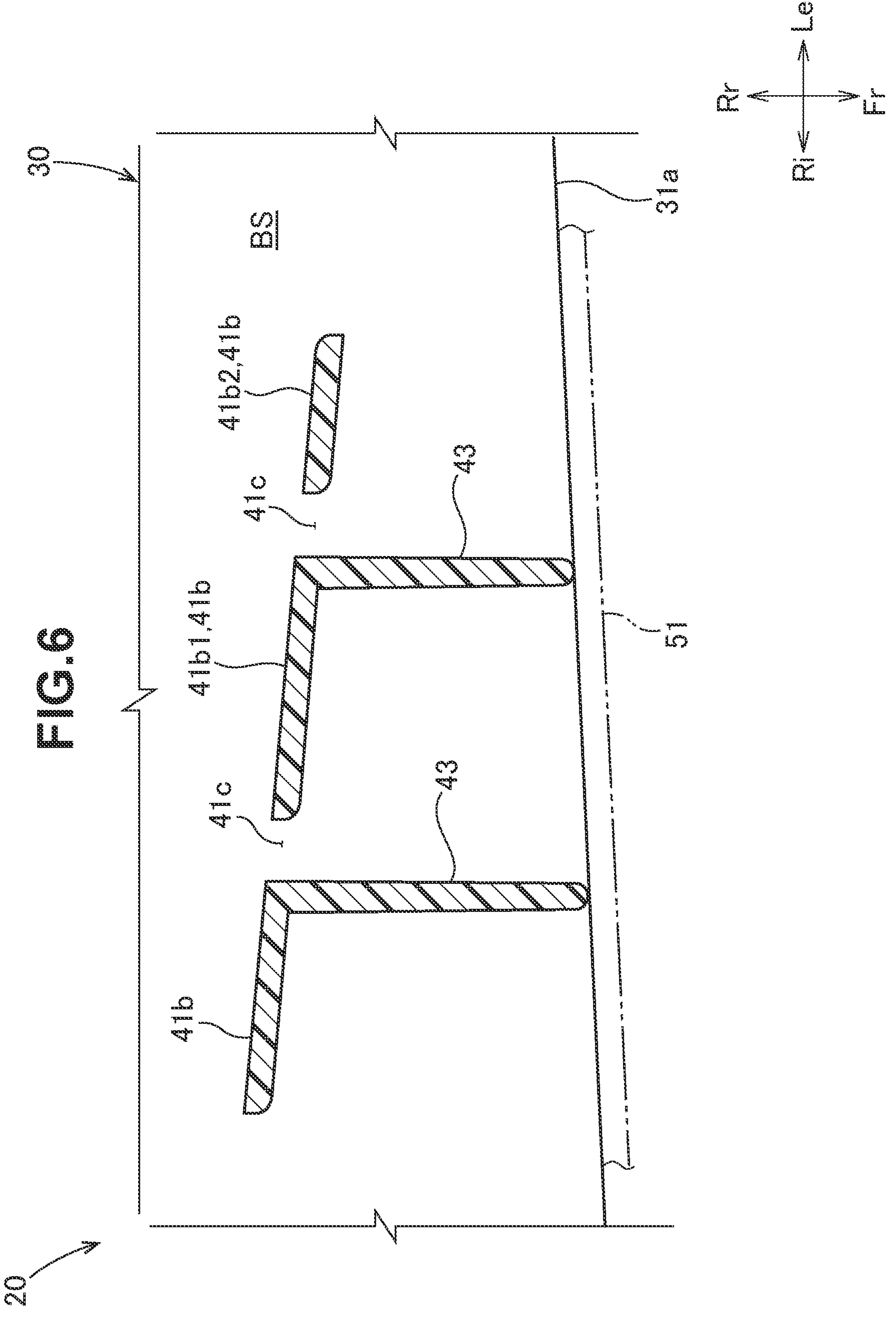
FIG. 6 is a view describing a modification example of the configuration illustrated in FIG. 3.

Referring to FIG. 6, the through-hole 41*c* are formed on a straight line connecting the protruding portions 41*b* adjacent to each other. In other words, the protruding portions 41*b* are formed on the same plane without steps. The protruding portions 41*b* are preferably formed in a stepped shape (refer to FIG. 3), but may be formed on the same plane. The reason will be described later.

Figure 7:
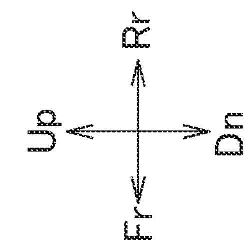
FIG. 7 is a view describing a modification example of the configuration illustrated in FIG. 4.
Figure 7:
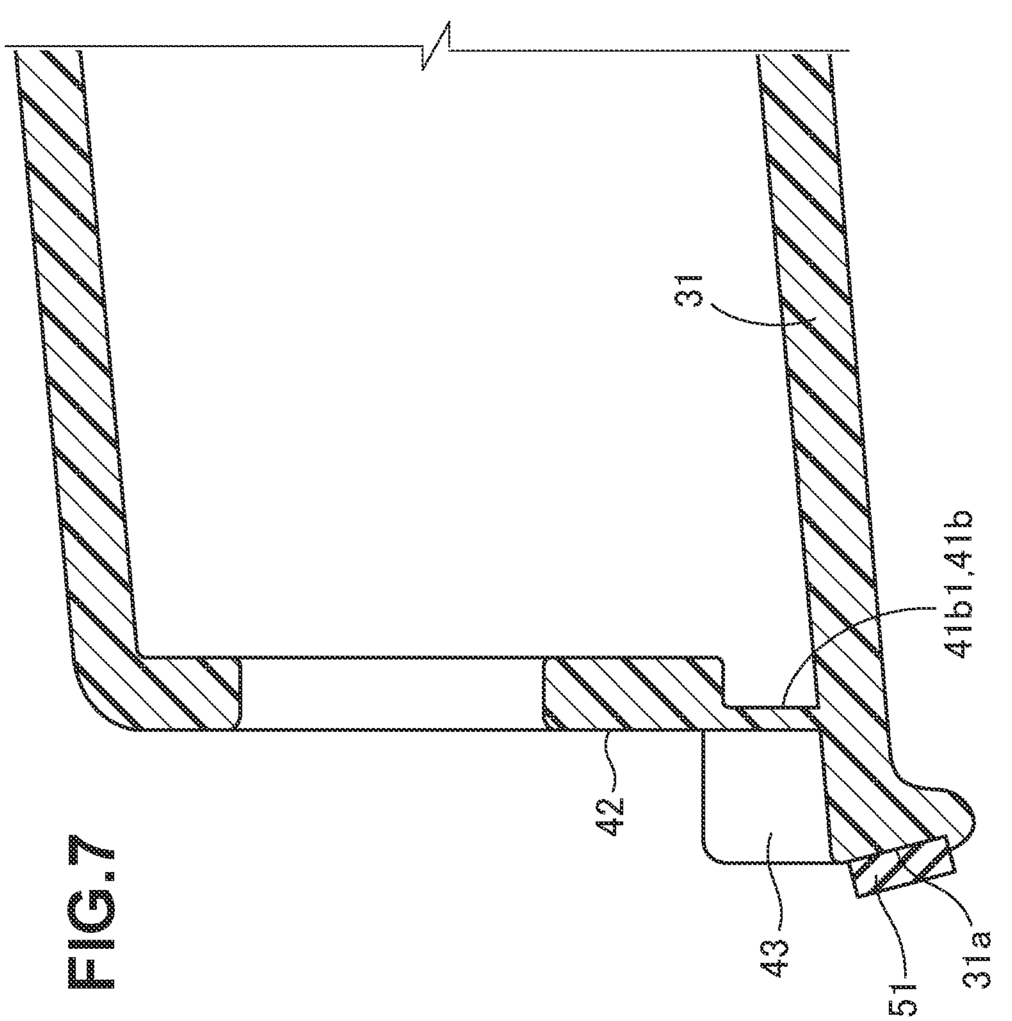

Referring to FIG. 7, the attachment wall 41 can also be configured so that the wall body 41*a* (refer to FIG. 4) is not provided and the protruding portions 41*b* protrude directly from the clip support member 42 toward the bent portion 31.

The resin-molded article 20 described above is summarized as follows.

Referring to FIG. 2, in a first aspect, the resin-molded article 20 is configured so that the body 30 having the design surface DS (refer to FIG. 1A) and the clip attachment member 40 which is formed on the back surface BS of the design surface DS of the body 30 and to which the clip is attachable are integrally formed. The clip attachment member 40 includes the attachment wall 41 raised from the back surface BS, and the ribs 43 extending from the attachment wall 41 to the back surface BS and reinforcing the attachment wall 41. The through-hole 41*c* penetrating through the attachment wall 41 are formed at positions adjacent to the ribs 43 of the attachment wall 41.

Figure 5B:
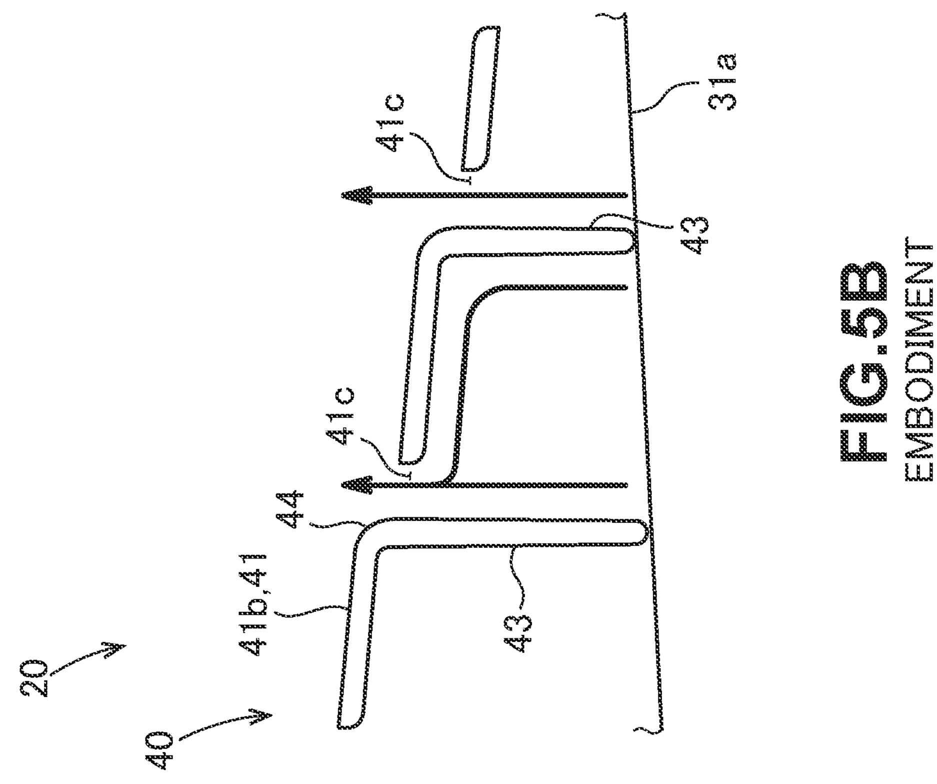
FIG. 5B is a view describing actions of the resin-molded article according to the embodiment.
Figure 5A:
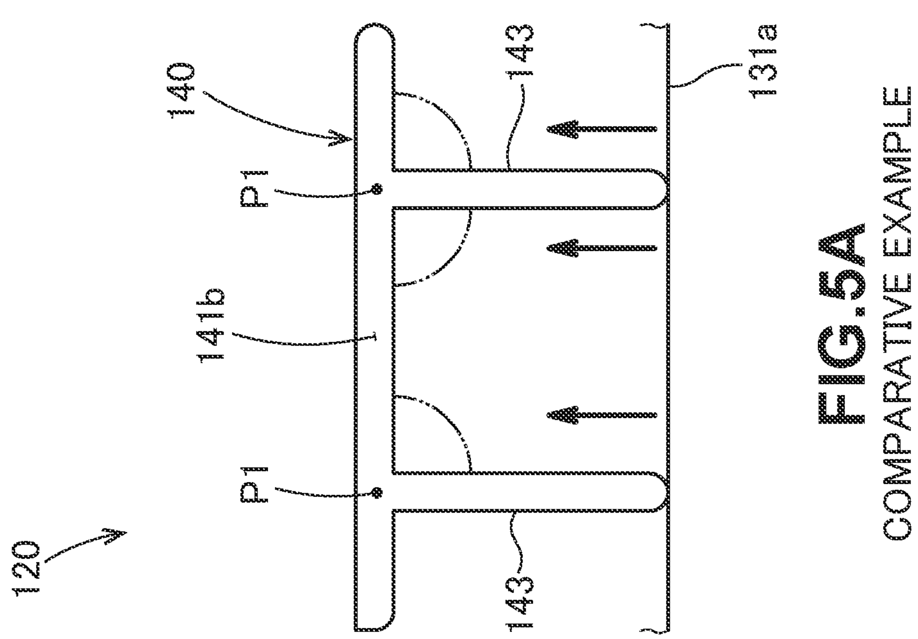
FIG. 5A is a view describing actions of a resin-molded article according to a comparative example.

Referring to FIG. 5A, a resin-molded article 120 according to a comparative example is configured so that an attachment wall 141 (clip attachment member 140) is continuously formed and a plurality of ribs 143 extend from the attachment wall 141. In the resin-molded article 120 including the clip attachment member 140 and the ribs 143, it has been found that portions P1 at which the clip attachment member 140 and the ribs 143 intersect each other become excessively thick where a large amount of resin concentrates, so that the design surface DS (refer to FIG. 1A) is likely to be recessed.

Referring to FIG. 5B, in the resin-molded article 20 according to the embodiment, the through-hole 41*c* penetrating through the attachment wall 41 are formed at positions adjacent to the ribs 43 of the attachment wall 41. By employing such a configuration, portions serving as starting points of the ribs 43 can be prevented from becoming excessively thick. The reason for the occurrence of defects having a recessed shape on the design surface DS (refer to FIG. 1A) is considered to be that at the excessively thick portions, the volume of resin that shrinks during cooling increases, so that the design surface DS becomes recessed. According to the resin-molded article 20, since the through-hole 41*c* are formed at the portions serving as the starting points of the ribs 43, the portions can be prevented from becoming excessively thick. Accordingly, the occurrence of a defect such as the design surface DS being formed in a recessed shape can be prevented. On the other hand, since the attachment wall 41 is reinforced by the ribs 43, the strength of the clip attachment member 40 can be sufficiently ensured. It is possible to provide the resin-molded article 20 capable of ensuring the strength of the clip attachment member 40 while preventing the occurrence of defects.

Referring to FIG. 3, in a second aspect, in the resin-molded article 20 according to the first aspect, the attachment wall 41 (particularly, refer to the portions 41*b*1 and 41*b*2 of the protruding portions 41*b*) is formed in a stepped shape with the through-hole 41*c* interposed therebetween, and the boundary portions 44 between the attachment wall 41 and the ribs 43 are formed in a curved shape. Accordingly, the boundary portions 44 between the protruding portions 41*b* and the ribs 43 can be formed in a curved shape, and the thickness from the ribs 43 to the protruding portions 41*b* via the boundary portions 44 having a curved shape can be formed constant, so that the occurrence of recesses on the design surface can be prevented while preventing the portions serving as the starting points of the ribs 43 from becoming excessively thick.

In a third aspect, in the resin-molded article 20 according to the first or second aspect, at least a part of the edge of the body 30 serves the seal attachment portion 31*a* to which the seal is attachable, and the plurality of ribs 43 are formed toward the seal attachment portion 31*a*. In addition, the through-hole 41*c* is formed to correspond to each of the plurality of ribs 43.

Referring to FIG. 5A, when a seal is attached to a seal attachment portion 131*a*, it is common to apply a primer to the seal attachment portion 131*a* in advance. When the ribs 143 are formed in the vicinity of the seal attachment portion 131*a*, the applied primer flows from the ribs 143 toward the attachment wall 141. Then, the primer that has flowed toward the attachment wall 141 accumulates in the vicinities of the portions P1 at which the attachment wall 141 and the ribs 143 intersect each other.

Referring to FIG. 5B, according to the resin-molded article 20, the through-hole 41*c* is formed to correspond to each of the plurality of ribs 43. For this reason, the primer that has flowed toward the attachment wall 41 passes through the through-hole 41*c*, so that the accumulation of the primer at the boundary portions 44 between the attachment wall 41 and the ribs 43 can be prevented.

Incidentally, the decorative component attached to a rear portion of the vehicle body has been described as an example of the invention; however, the decorative component may be another component provided on the outside of the vehicle or may be provided in a passenger compartment. Further, the invention is applicable even to components attached to others beside the vehicle, and the application of the invention is not limited to the embodiment.

In addition, in the resin-molded article 20 of the embodiment, the configuration in which the ribs 43 are formed in the vicinity of the bent portion 31 has been described as an example. However, the ribs 43 may be formed on the back surface BS at locations other than the bent portion. Namely, the portions at which the ribs 43 are formed are not limited to the positions of the embodiment as long as the clip attachment member 40 is formed on the back surface BS.

The invention is not limited to the embodiment as long as the actions and effects of the invention are exhibited.

The resin-molded article of the invention is suitable for a decorative component for a vehicle.

What is claimed is:

1. A resin-molded article comprising:

a body having a design surface; and a clip attachment member which is formed on a back surface of the design surface of the body and to which a clip is attachable, the body and the clip attachment member being integrally formed with one another, wherein the clip attachment member includes an attachment wall raised from the back surface, and a rib extending from the attachment wall to the back surface and reinforcing the attachment wall, and a through-hole penetrating through the attachment wall is formed at a position adjacent to the rib of the attachment wall, wherein the attachment wall is formed in a stepped shape with the through-hole interposed between portions of the attachment wall, and a boundary portion between the attachment wall and the rib is formed in a curved shape.

2. A resin-molded article comprising:

a body having a design surface; and a clip attachment member which is formed on a back surface of the design surface of the body and to which a clip is attachable, the body and the clip attachment member being integrally formed with one another, wherein the clip attachment member includes an attachment wall raised from the back surface, and a rib extending from the attachment wall to the back surface and reinforcing the attachment wall, and a through-hole penetrating through the attachment wall is formed at a position adjacent to the rib of the attachment wall, wherein at least a part of an edge of the body serves as a seal attachment member to which a seal is attachable, wherein the rib is one of a plurality of the-ribs that are formed one the attachment wall and extend from the attachment wall toward the seal attachment member, and wherein the through-hole is one of a plurality of through-holes, and wherein each of the plurality of through-holes corresponds to each of the plurality of ribs.

3. A resin-molded article comprising:

a body having a design surface; and a clip attachment member which is formed on a back surface of the design surface of the body and to which a clip is attachable, the body and the clip attachment member being integrally formed with one another, wherein the clip attachment member includes an attachment wall raised from the back surface, and a rib extending from the attachment wall to the back surface and reinforcing the attachment wall, and a through-hole penetrating through the attachment wall is formed at a position adjacent to the rib of the attachment wall, wherein the attachment wall is formed in a stepped shape with the through-hole interposed between portions of the attachment wall, and a boundary portion between the attachment wall and the rib is formed in a curved shape, wherein at least a part of an edge of the body serves as a seal attachment member to which a seal is attachable, wherein the rib is one of a plurality of the-ribs that are formed on the attachment wall and extend from the attachment wall toward the seal attachment member, and wherein the through-hole is one of a plurality of through-holes, and wherein each of the plurality of through-holes corresponds formed to correspond to each of the plurality of ribs.

* * * * *